US012330892B2

(12) United States Patent
Udy

(10) Patent No.: US 12,330,892 B2
(45) Date of Patent: Jun. 17, 2025

(54) CARGO UNLOADING SYSTEM AND METHOD OF OPERATION

(71) Applicant: MAXILODA LIMITED, Hamilton (NZ)

(72) Inventor: Grant Antony Udy, Hamilton (NZ)

(73) Assignee: MAXILODA LIMITED, Hamilton (NZ)

( * ) Notice: Subject to any disclaimer, the term of this patent is extended or adjusted under 35 U.S.C. 154(b) by 215 days.

(21) Appl. No.: 17/910,284

(22) PCT Filed: Mar. 9, 2021

(86) PCT No.: PCT/NZ2021/050038
§ 371 (c)(1),
(2) Date: Sep. 8, 2022

(87) PCT Pub. No.: WO2021/182977
PCT Pub. Date: Sep. 16, 2021

(65) Prior Publication Data
US 2023/0139319 A1    May 4, 2023

(30) Foreign Application Priority Data

Mar. 9, 2020 (NZ) .................................. 762460

(51) Int. Cl.
*B65G 67/04* (2006.01)
*B66F 9/075* (2006.01)
*B66F 9/14* (2006.01)

(52) U.S. Cl.
CPC ............ *B65G 67/04* (2013.01); *B66F 9/0755* (2013.01); *B66F 9/142* (2013.01)

(58) Field of Classification Search
CPC ......... B65G 67/04; B66F 9/0755; B66F 9/142
See application file for complete search history.

(56) References Cited

U.S. PATENT DOCUMENTS

| 2,706,062 A | 4/1955 | Turner et al. |
| 3,504,810 A | 4/1970 | Walda |

(Continued)

FOREIGN PATENT DOCUMENTS

| DE | 2425513 A1 | 12/1975 |
| EP | 2589550 A4 | 9/2014 |

(Continued)

OTHER PUBLICATIONS

International Search Report and Written Opinion of the ISA/AU dated Jun. 15, 2021 in International Application No. PCT/NZ2021/050038; 8pgs.

*Primary Examiner* — Saul Rodriguez
*Assistant Examiner* — Willie W Berry, Jr.
(74) *Attorney, Agent, or Firm* — Haukaas Fortius PLLC; Michael Haukaas

(57) ABSTRACT

Cargo loading systems for use with a cargo storage area of a vehicle are described. In one form, the cargo loading system has a mast frame and a carriage assembly supported by the mast frame. The carriage assembly has lifting forks, and a fork lateral control mechanism configured to control lateral movement of the lifting forks across the carriage assembly. A carriage pivot control mechanism controls pivotal movement of the carriage assembly relative to the mast frame about a first vertical axis. A fork pivot control mechanism controls pivotal movement of the lifting forks relative to the carriage assembly about a second vertical axis, between a first position in which the lifting forks extend away from the carriage assembly and a second position in which the lifting forks extend along carriage assembly. A carriage vertical control assembly controls raising and lowering of the carriage assembly relative to the mast frame, and a mast frame actuating assembly controls lateral movement (Continued)

of the mast frame relative to an open end of the cargo storage area of the vehicle.

7 Claims, 13 Drawing Sheets

(56) References Cited

U.S. PATENT DOCUMENTS

| | | | |
|---|---|---|---|
| 4,470,750 A | 9/1984 | Vockinger | |
| 2013/0209203 A1* | 8/2013 | Rafols | B66C 9/10 |
| | | | 414/666 |
| 2016/0075542 A1* | 3/2016 | Buchmann | B66F 17/003 |
| | | | 414/667 |

FOREIGN PATENT DOCUMENTS

| | | | |
|---|---|---|---|
| FR | 2517268 B1 | 4/1986 | |
| GB | 1210575 A | 10/1970 | |

* cited by examiner

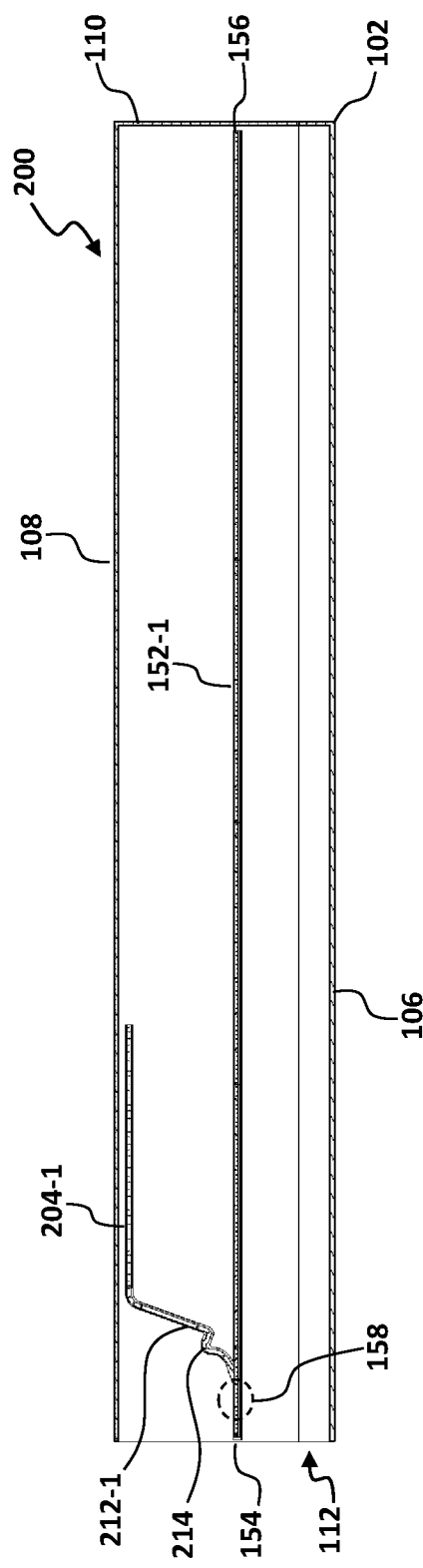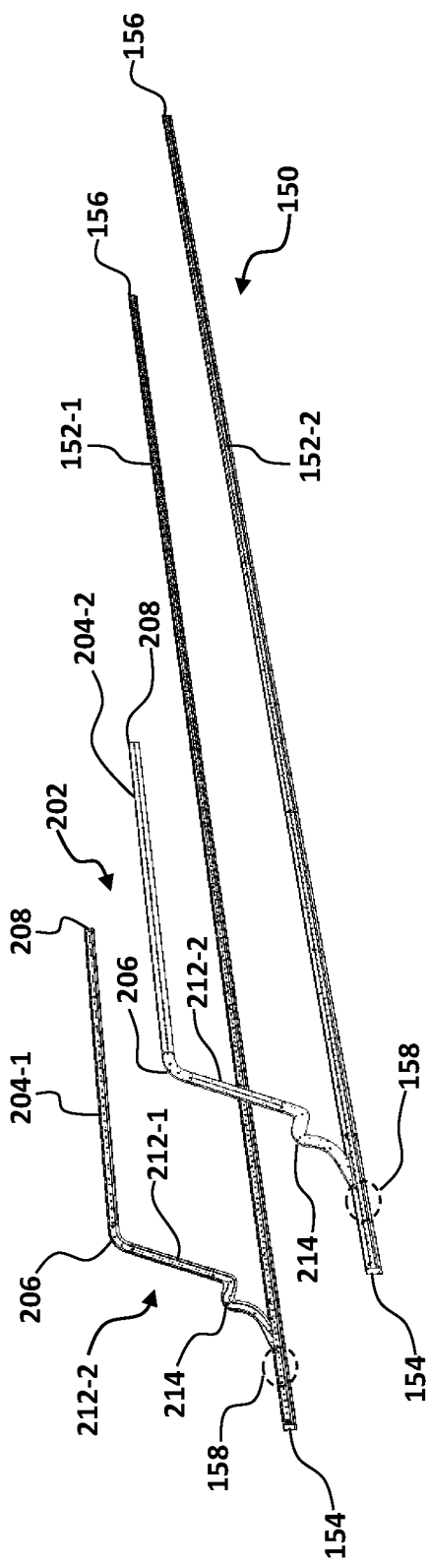

CARGO UNLOADING SYSTEM AND METHOD OF OPERATION

STATEMENT OF CORRESPONDING APPLICATIONS

This application is a National Stage filing under 35 U.S.C. § 371 of International Application No. PCT/NZ2021/050038 filed Mar. 9, 2021 which claims the benefit of New Zealand Patent Application No. 762460, filed Mar. 9, 2020, the entire contents of which are incorporated herein by reference.

TECHNICAL FIELD

The present invention relates to systems and methods for use in unloading and/or loading of cargo from a vehicle.

BACKGROUND

Cargo vehicles, such as semi-trailers, box trucks, vans, train cars, etc. are often used to transport or temporarily store cargo. Depending on the shape, size, quantity, orientation or other characteristics of the cargo, it may be difficult to maximize efficient use of the cargo space of those vehicles. For example, certain cargo units, such as individual items or pallets of items, may be relatively short compared to the height of the semi-trailer, but the nature of the items may prevent them from being stacked on top of one another. As a result, there may be significant amounts of wasted space in the upper portions of the semi-trailer.

Systems are known for improving the efficiency of such cargo spaces. For example, the MAXILODA™ trailer cargo double stacking systems provided by Maxiloda Limited (www.maxiloda.co.nz) allow for cargo to be stacked on a second level provided by trolleys supported by rails mounted to the walls of the trailer. However, the unloading and loading of cargo from such vehicles, particularly large vehicles, can be challenging in the absence of a loading bay and associated equipment. This is especially so for cases in which small volumes are being unloaded or loaded at numerous locations.

One means of performing this is a forklift, however this is reliant on ownership and maintenance of a forklift (as well having personnel on hand qualified to operate a forklift), which is a significant cost to small businesses. Tail lifts are known which provide a platform on the back of a truck which may be raised and lowered, with a pallet truck used to maneuver pallets relative to the tail lift for loading or unloading. However, such tail lifts only reach the floor of the vehicle (i.e. cannot reach higher levels), and require manual handling of cargo at height which presents a potential health and safety hazard. Further, both of these options are relatively time consuming.

The present application is directed to overcoming one or more of the problems discussed above.

It is an object of the present invention to address one or more of the foregoing problems or at least to provide the public with a useful choice.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

Further aspects and advantages of the present invention will become apparent from the ensuing description which is given by way of example only.

SUMMARY

According to one aspect of the present technology there is provided a cargo loading system for use with a cargo storage area of a vehicle, the cargo loading system comprising:
  a mast frame;
  a carriage assembly supported by the mast frame, the carriage assembly comprising:
    lifting forks;
    a fork lateral control mechanism configured to control lateral movement of the lifting forks across the carriage assembly; and
    a carriage pivot control mechanism configured to control pivotal movement of the carriage assembly relative to the mast frame about a first vertical axis;
    a fork pivot control mechanism configured to control pivotal movement of the lifting forks relative to the carriage assembly about a second vertical axis, between a first position in which the lifting forks extend away from the carriage assembly and a second position in which the lifting forks extend along the carriage assembly;
  a carriage vertical control assembly configured to control raising and lowering of the carriage assembly relative to the mast frame;
  a mast frame actuating assembly configured to control lateral movement of the mast frame relative to an open end of the cargo storage area of the vehicle.

According to one aspect of the present technology there is provided a cargo loading system for use with a cargo storage area of a vehicle, the cargo loading system comprising:
  a mast frame;
  a carriage assembly supported by the mast frame, the carriage assembly comprising:
    lifting forks;
    a fork lateral control mechanism configured to control lateral movement of the lifting forks across the carriage assembly; and
    a fork axial control mechanism configured to control axial movement of the lifting forks between an extended position in which the lifting forks extend from the carriage assembly in a first direction and a retracted position in which the lifting forks extend from the carriage assembly in a second direction opposite to the first direction;
  a carriage vertical control assembly configured to control raising and lowering of the carriage assembly relative to the mast frame;
  a mast frame actuating assembly configured to control movement of the mast frame relative to an open end of the cargo storage area of the vehicle, between a first position adjacent to the open end and a second position away from the open end.

According to one aspect of the present technology there is provided a cargo loading system for use with a cargo storage area of a vehicle, the cargo loading system comprising:
- a mast frame;
- a carriage assembly supported by the mast frame, the carriage assembly comprising:
  - lifting forks;
  - a fork lateral control mechanism configured to control lateral movement of the lifting forks across the carriage assembly; and
- a carriage vertical control assembly configured to control raising and lowering of the carriage assembly relative to the mast frame;
- a mast frame actuating assembly configured to control movement of the mast frame relative to an open end of the cargo storage area of the vehicle.

In examples, the cargo loading system is configured for use with a vehicle cargo storage system in which a cargo storage area has at least two levels on which cargo may be loaded. In examples, the vehicle cargo storage system may be that described in New Zealand Patent Application No. 752996, the contents of which are hereby incorporated by reference. In use, the system allows for movement of the lifting forks between those levels and ground level, as well as across the cargo storage area. This allows for cargo, especially loaded on pallets, to be moved between these various locations. For completeness: where reference is made to use of the present technology in the unloading of cargo, it should be appreciated that the technology may also be used in the loading of cargo.

Mast Frame

In examples the mast frame may comprise a primary mast.

In examples, the mast frame may comprise a floor assembly comprising a first floor portion and a second floor portion. In examples the first floor portion may be configured to remain stationary in use, and the second floor portion may be configured to move with the primary mast. In examples the first floor portion and the second floor portion may overlap. In examples the second floor portion may comprise a recess portion configured to permit passage of the carriage assembly as it is raised and lowered along the primary mast.

In examples, the mast frame may comprise a first mast and a second mast. The mast frame may comprise a crossmember between the first mast and the second mast. In examples, the crossmember may be connected between upper ends of the first mast and the second mast—i.e. producing a substantially "U" shaped frame.

In examples, the carriage assembly may span between the first mast and the second mast. In examples, the carriage assembly may be mounted to guides provided on the first mast and the second mast to guide vertical movement of the carriage assembly. For example, the carriage assembly may be mounted to one or more vertical rails on the mast frame using linear bearings. Carriage assembly In examples the carriage assembly may be mounted to the primary mast. In examples the first vertical axis may be provided proximal to the primary mast.

In examples, the fork pivot control mechanism may comprise a rotary actuator configured to pivot the forks about the second vertical axis, relative to the carriage assembly. For example, the rotary actuator may comprise a helical hydraulic rotary actuator.

In an alternative example, the fork pivot control mechanism may comprise a hinge, and a linear actuator (for example a hydraulic cylinder) actuating a lever arm to pivot the carriage assembly about the hinge.

In examples, the carriage assembly may comprise a carriage to which the lifting forks are mounted. The carriage may be mounted to a guide for lateral movement across the carriage assembly. For example, the carriage may be mounted to one or more horizontal rails using linear bearings. In examples, the fork pivot control mechanism may be provided to the carriage.

In examples, the carriage assembly may comprise a main carriage arm, wherein the carriage is mounted to the main carriage arm such that movement along a longitudinal axis of the main carriage arm is permitted. In examples, the carriage may comprise a base portion configured to be mounted to the main carriage arm, and a fork arm to which the lifting forks are provided, wherein the fork pivot control mechanism is provided between the base portion and the fork arm.

The fork lateral control mechanism provides a means for controlling lateral movement of the forks (i.e. side-shift), for example to allow for selecting between articles of cargo or pallets stored next to each other. In examples, the fork lateral control mechanism may comprise at least one actuator configured to be controlled to drive the carriage laterally across the carriage assembly. In examples the actuator may be a linear actuator, such as a screw based linear actuator (for example, a ball screw drive), or a pressure driven cylinder (for example a hydraulic or pneumatic cylinder).

In examples, the forks may be configured to pivot between an upright stored position, and a lowered in use position. Reference to axial movement of a lifting fork should be understood to mean movement in a direction parallel with the longitudinal axis of the fork, i.e. the axis between the ends of the fork along its length. In examples, the fork axial control mechanism may comprise a rack and pinion drive. In such an example, each fork may include a rack configured to engage with a pinion gear. Rotation of the respective pinion gears, for example driven by a motor, may be used to drive the forks between the extended position and the retracted position.

In use, when in the extended position the forks may be used to support a load for vertical and/or lateral movement. In the retracted position, clearance is provided to allow for movement of the carriage and/or mast frame.

It should be appreciated that alternative means for controlling axial movement of the forks are contemplated, for example using one or more linear actuators (for example, a ball screw drive) or one or more telescopic pressure driven cylinders.

In examples, the carriage assembly may comprise a drag chain between a power source and the carriage, the drag chain configured to deliver power to the fork axial control mechanism.

Carriage Pivot Control Mechanism

In examples, the carriage pivot control mechanism may comprise a rotary actuator configured to pivot the carriage assembly about the first vertical axis, relative to the mast frame. For example, the rotary actuator may comprise a helical hydraulic rotary actuator.

In an alternative example, the carriage pivot control mechanism may comprise a hinge, and a linear actuator (for example a hydraulic cylinder) actuating a lever arm to pivot the carriage assembly about the hinge.

Carriage Vertical Control Assembly

In examples, the carriage vertical control assembly may be configured to have sufficient travel to lower the lifting forks to ground level (appreciating that some clearance may be provided to allow for common pallet designs), and raise the forks above the height of an upper deck of a multi-deck cargo storage system.

In examples, the carriage vertical control assembly may include at least one lifting actuator. For example, the carriage vertical control assembly may comprise at least one hydraulic cylinder with a lift chain connected to the carriage assembly—more particularly a hydraulic cylinder with associated lift chain at either end of the carriage assembly. Other examples of lifting mechanisms include linear actuators (for example, a ball screw drive, lead screw drive, or rack and pinion), or a winch pulling lifting cables that control the carriage assembly height relative to ground.

Mast Frame Actuating Assembly

In examples in which the mast frame actuating assembly is configured to control lateral movement of the mast frame relative to an open end of the cargo storage area of the vehicle, the mast frame actuating assembly may comprise one or more lateral frame actuators. In examples the lateral frame actuators may comprise one or more hydraulic cylinders, although alternative linear actuators are contemplated such as ball screw drives, lead screw drives, or rack and pinion.

In examples, the mast frame actuating assembly may comprise one or more lateral linear guides. In examples, the primary mast may be configured to slide along the one or more lateral linear guides.

In examples, the mast frame actuating assembly may be configured to guide movement of the mast frame such that the second position is lower than the first position relative to ground.

In examples, the mast frame actuating assembly may comprise a linkage guiding movement of the mast frame through an arc between the first position and the second position. In examples, the linkage may comprise a four-bar linkage. In examples, the four-bar linkage may be configured as a parallel four-bar linkage, such that the mast frame is maintained in a vertical orientation throughout movement between the first position and the second position.

In an alternative example, the mast frame actuating assembly may be configured to move the mast frame in a linear motio—i.e. in a horizontal plane between the first position and the second position—for example, using a pantograph linkage or telescoping beams. In such an example, the mast frame may also be lowered and raised to assist in achieving a desired height relative to ground for the lifting forks to unload and load the cargo.

In examples, the system may include a vehicle mounted frame to which the mast frame is connected by the mast frame actuating assembly. In such examples, the vehicle mounted frame may be secured to the end of the cargo storage area. In examples, the vehicle mounted frame may be permanently secured to the vehicle—however it is also envisaged that in alternative examples the vehicle mounted frame may be releasably secured to the vehicle.

In alternative examples, the mast frame actuating assembly may be secured directly to the vehicle, i.e. without an intermediate vehicle mounted frame.

System Control

In examples, the various movements of the system described herein may be controlled manually, automatically, or by a combination thereof.

In examples in which the mast frame actuating assembly is configured to guide movement of the mast frame through an arc, the carriage vertical control assembly may be controlled to raise the carriage assembly relative to the mast frame during at least a portion of the movement of the mast frame away from the cargo storage area while the forks are in the extended position. It is envisaged that this may be required in certain configurations to ensure that tips of the lifting forks clear the storage space or components thereof. However, it is also envisaged that such control may not be required in other configurations.

The above and other features will become apparent from the following description and the attached drawings.

BRIEF DESCRIPTION OF THE DRAWINGS

Further aspects of the present invention will become apparent from the ensuing description which is given by way of example only and with reference to the accompanying drawings in which:

FIG. 1-2 is a perspective view of the first cargo storage system;

FIG. 2-1 is a side view of an exemplary second cargo storage system installed in a cargo storage area of a cargo vehicle;

FIG. 2-2 is a perspective view of the second cargo storage system;

FIG. 3-1 is a first perspective view of a support platform comprising a plurality of the support beams;

FIG. 3-2 is a second perspective view of the support platform;

FIG. 5-1 is a perspective view of an exemplary lifting fork carriage assembly of the first cargo loading system, having lifting forks extended;

FIG. 5-2 is a perspective view of the exemplary lifting fork carriage assembly having lifting forks retracted;

FIG. 6-1 is a perspective view of the first cargo loading system with the lifting fork carriage assembly in a raised position;

FIG. 6-2 is a perspective view of the first cargo loading system with the lifting fork carriage assembly in a lowered position;

FIG. 6-3 is a side view of lifting mechanism 600;

FIG. 7-1 to 7-3 are side views of the first cargo loading system in various stages of operation;

FIGS. 9-1 to 9-5 are views of an exemplary lifting fork carriage assembly of the second cargo loading system;

FIG. 11-1 is a perspective view of a floor assembly of the second cargo loading system in an expanded condition;

FIG. 11-2 is a perspective view of a floor assembly of the second cargo loading system in a contracted condition; system;

FIG. 12-1 is a perspective view of the second cargo loading system in an exemplary stage of operation; and FIG. 12-2 is a perspective view of the second cargo loading system in another exemplary stage of operation.

DETAILED DESCRIPTION

Cargo Storage Systems

Figure 1:
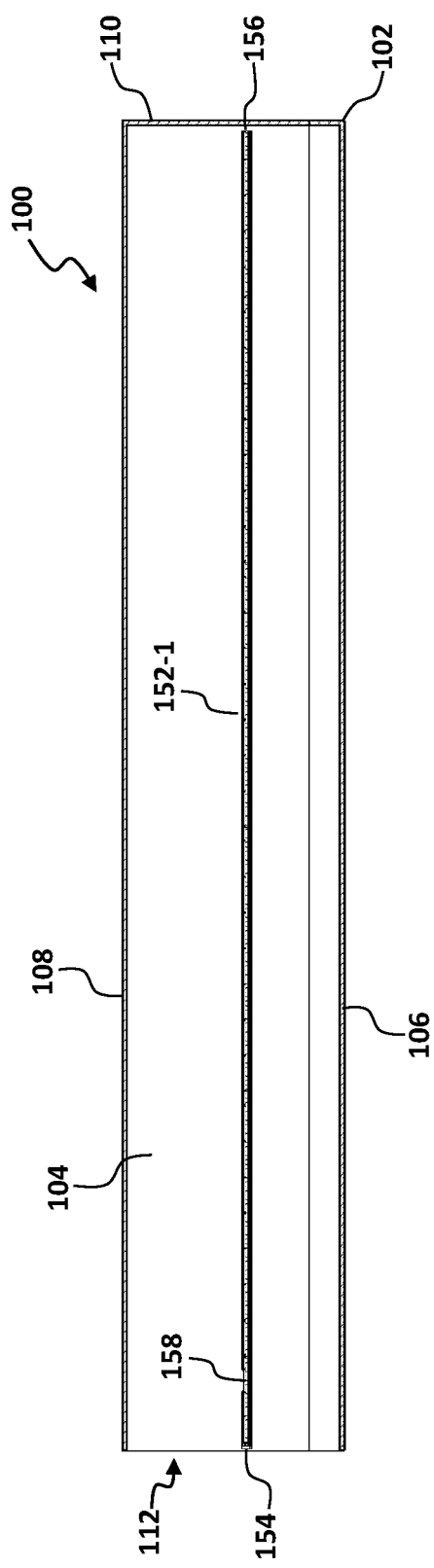
FIG. 1-1 is a side view of an exemplary first cargo storage system installed in a cargo storage area of a cargo vehicle.
Figures 1, 2:
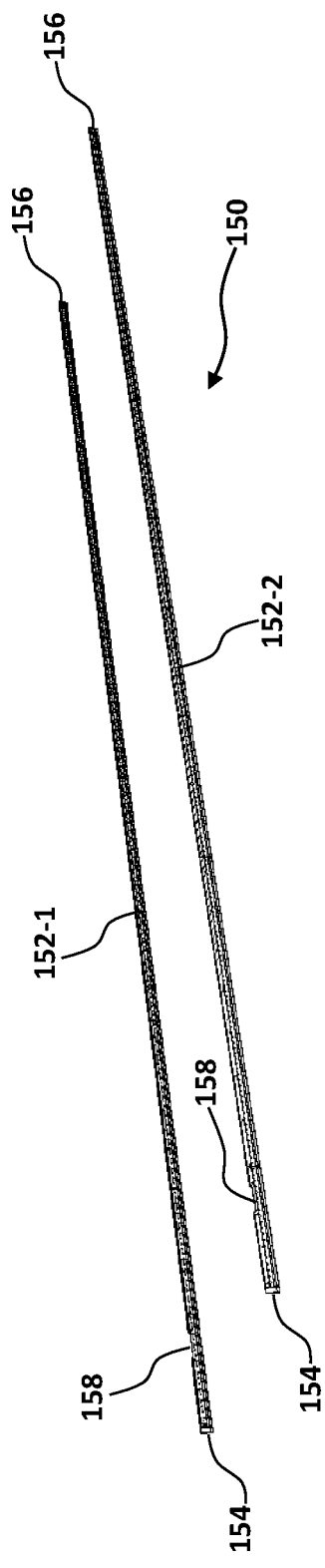

FIG. 1-1 illustrates a first cargo storage system 100 installed in a cargo storage area 102 of a cargo vehicle (not illustrated), with which aspects of the present technology may be used. The cargo storage area 102 is defined by side walls 104, floor 106, ceiling 108, a forward end wall 110, and a rearward end 112 which is shown in an open condition, but may be closed (for example by a door or doors). Referring to FIG. 1-2, the first cargo storage system 100 comprises a first pair 150 of rails, comprising first load rail 152-1 and second load rail 152-2 (referred to herein as load rails 152), each rail 152 having a first end 154 and a second end 156. The load rails 152 have enclosed tracks to receive track guides of support beams, as will be described further below. In the exemplary embodiment illustrated, entry into the enclosed track from the first end 154 and/or second end 156 of each load rail 152 is blocked (for example by end caps). Instead, each of the load rails 152 comprises a drop in beam opening 158 on an upper side of the load rail 152, leading into the enclosed track in order to allow support beams to be introduced to, and retrieved from, the load rails 152. In the exemplary embodiment illustrated, the drop in beam openings 158 are provided proximate to, but offset from, the first ends 154 of the load rails 152. This allows a user to stand on the floor 106 of the cargo storage area 102 between the load rails 152 while inserting the support beams into, or retrieving them from, the drop in beam openings 158—while also maximizing the useful length of the load rails 152 in use, as will become more evident from the description below.

FIG. 2-1 illustrates a second cargo storage system 200 installed in a cargo storage area 102 substantially as described above with reference to FIG. 1-2. Referring to FIG. 2-2, the second cargo storage system 200 comprises a first pair 150 of rails comprising first load rail 152-1 and second load rail 152-2, substantially as described above with reference to FIG. 1-1 and FIG. 1-2. The second cargo storage system 200 further comprises a second pair 202 of rails, comprising first storage rail 204-1 and second storage rail 204-2 (referred to herein as storage rails 204), each storage rail 204 having a first end 206 and a second end 208. Similar to the load rails 152, the storage rails 204 have enclosed tracks to receive track guides of support beams. In the exemplary embodiment illustrated, entry into the enclosed track from the second end 208 of each storage rail 204 is blocked (for example by end caps).

The storage rails 204 are provided above the load rails 152, at a height proximate the ceiling 108 of the cargo storage area 102. The second cargo storage system 200 comprises a third pair 210 of rails, comprising first transition rail 212-1 and second transition rail 212-2 (referred to herein as transition rails 212). The transition rails 212 also have enclosed tracks to receive track guides of support beams, and facilitate the transfer of support beams between the load rails 152 and the storage rails 204. In the embodiment illustrated, the transition rails 212 follow a nonvertical path between the first ends 206 of the storage rails 204 and points offset from the first ends 154 of the load rails 152 at which a junction is formed across which the support beams can be transferred. In the embodiment illustrated, the transition rails 212 enter the junctions at an acute angle relative to the portions of the load rails 152 extending from the junctions towards the second ends 156.

In the embodiment illustrated, each transition rail 212 comprises a safety station 214 configured to present a tortuous section to a support beam passing through it, particularly to interrupt or at least slow unrestrained descent of a support beam from the storage rails 204 to the load rails 152. In this embodiment, the enclosed track through the safety station 214 has a reverse curvature.

In exemplary embodiments, each of the load rails 152 may comprise a drop in beam opening 158 on an upper side of the load rail 152. In exemplary embodiments the drop in beam openings 158 may be provided between the junctions and the first ends 154 of the load rails 152—although it is expressly noted that alternative locations are contemplated, for example in the safety stations 214.

In some use cases, it may be beneficial to permanently retain the support beams within the system 200. However, the ability to easily remove beams from the system 200 on demand is envisaged as providing benefits in other cases. For example, the support beams may contribute a significant proportion of the total mass of the system 200. Being able to remove the beams to increase the load capacity of the cargo vehicle may be valuable, especially if the vehicle is to be used in this configuration (i.e. without support beams, or with a lower number of beams) for an extended period of time. Further, the stored support beams may occupy volume, or limit the height, of the cargo storage area—removal of the support beams where otherwise not required may assist with recovering this space. The beams may be stored at a vehicle depot, or potentially used in another vehicle that has the system 200 fitted. For entities operating a number of cargo vehicles with the system 100 and/or system 200 fitted, this may allow for distribution of the support beams on a case by case basis—potentially reducing the total number of support beams required by that entity (with associated benefits in terms of costs and storage space required).

Figures 1, 3:
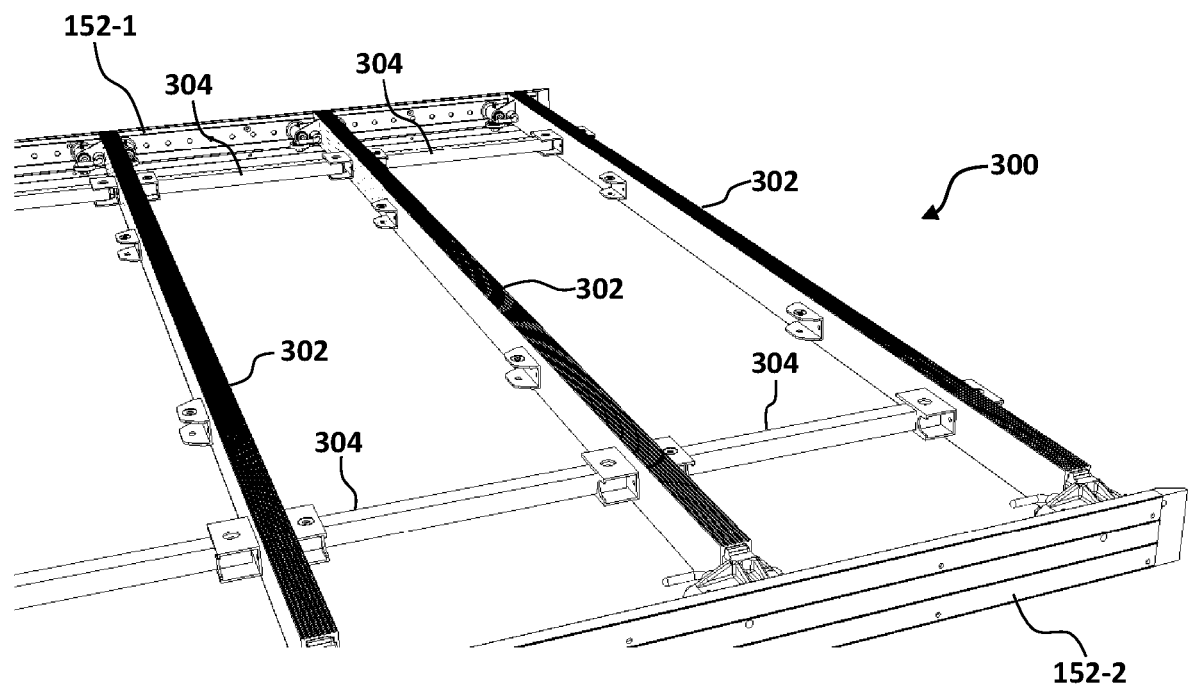
Figures 2, 3:
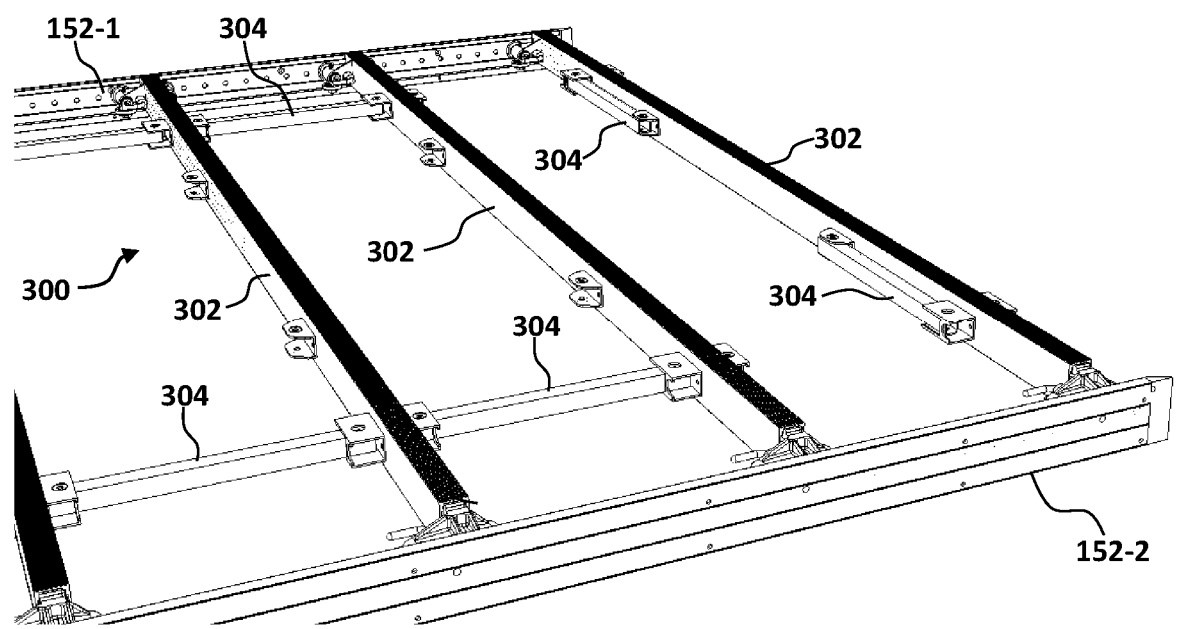

FIG. 3-1 illustrates a support platform 300 provided by a plurality of support beams 302 mounted on load rails 152, secured relative to each other using spacer beams 304. In use, cargo may be loaded (whether directly, or via pallets) onto the support platform 300). FIG. 3-2 illustrates one of the support beams 304 released from the neighboring support beam 304 and the remaining support platform 300, allowing for independent movement along the load rails 152.

First Exemplary Cargo Loading System

Figure 4:
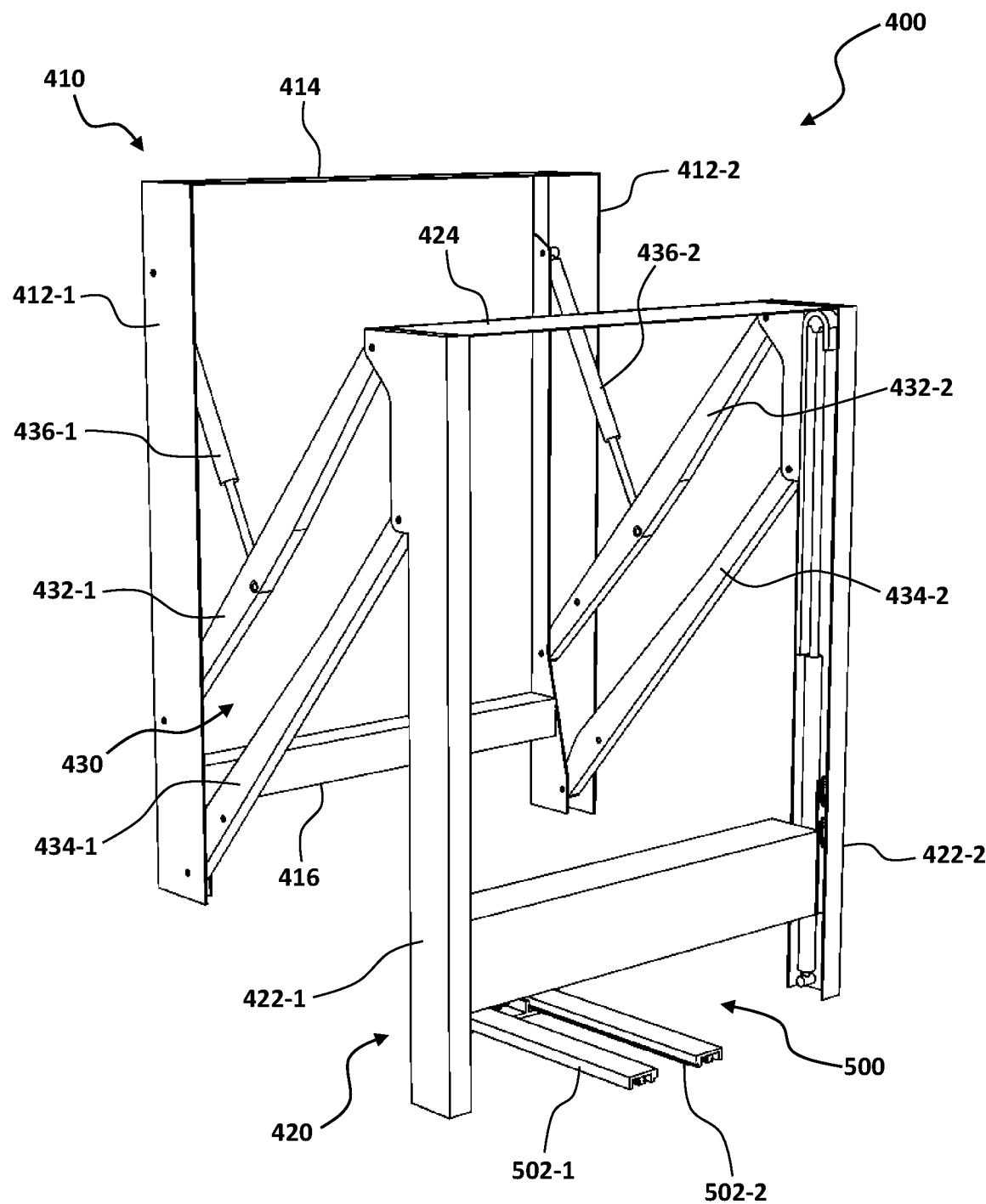
FIG. 4 is a perspective view of a first exemplary cargo loading system.

FIG. 4 illustrates a cargo loading system 400 according to one aspect of the present technology. The system 400 includes a vehicle mounted frame 410 configured to be secured to the cargo storage area 102 at the rearward end 112. The vehicle mounted frame 410 includes a first upright member 412-1 and a second upright member 412-2, in use disposed to either side of the opening of the cargo storage area 102. In this example, the vehicle mounted frame 410 further includes an upper crossmember 414 and a lower crossmember 416 connecting the first upright member 412-1 and the second upright member 412-2.

The system 400 further includes a mast frame 420, having a first mast 422-1 and a second mast 422-2, and a mast plate 424 connecting the first mast 422-1 and a second mast 422-2. A mast frame actuating assembly in the form of a planar four-bar linkage (referred to herein as linkage 430) is provided between the vehicle mounted frame 410 and the mast frame 420. The linkage 430 includes upper pivot arms 432-1 and 432-2, and lower pivot arms 434-1 and 434-2. Movement of the linkage 430 is controlled by first linkage hydraulic cylinder 436-1 and second linkage hydraulic cylinder 436-2, connected between the upright members 412 of the vehicle mounted frame 410 and the upper pivot arms 432.

Figures 1, 5:
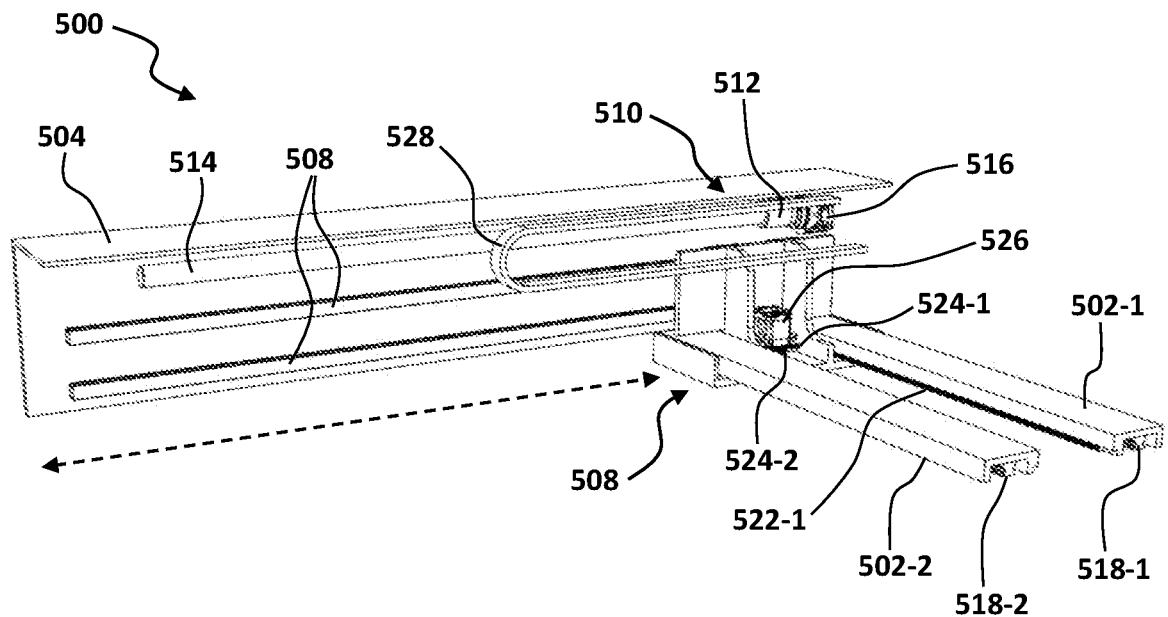
Figures 2, 5:
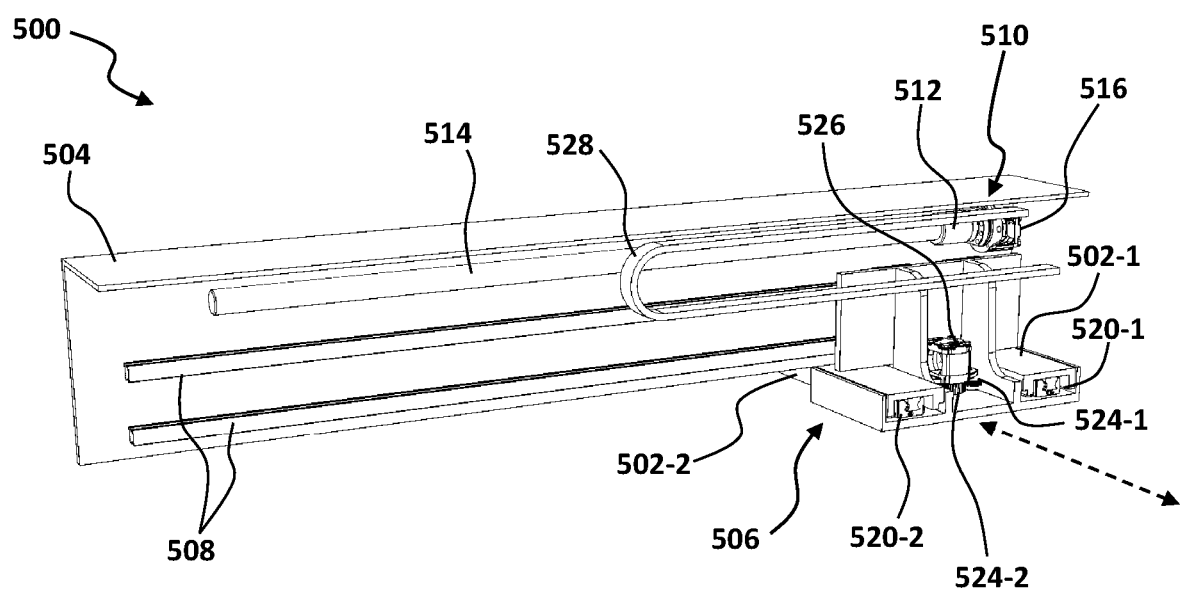

A carriage assembly 500 is supported by the mast frame 420, including first lifting fork 502-1 and second lifting fork 502-2 (referred to herein as lifting forks 502). Referring to FIG. 5-1 and FIG. 5-2, the carriage assembly 500 includes a carriage assembly frame 504 and a lifting fork carriage 506. The lifting fork carriage 506 is mounted to carriage rails 508 using linear bearings (not shown), which guide lateral movement of the lifting fork carriage 506 laterally across the carriage assembly 500 (i.e. along the carriage assembly frame 504 between first mast 422-1 and second mast 422-2).

A fork lateral control mechanism 510 is provided to control lateral movement of the lifting fork carriage 506. In this example, the fork lateral control mechanism 510 includes a linear actuator in the form of a ball screw nut 512 (not illustrated, but secured to the lifting fork carriage 506) mounted to a threaded shaft 514 which is driven by a first carriage hydraulic motor 516.

FIG. 5-1 shows the lifting forks 502 in an extended position, i.e. projecting in a direction towards the vehicle mounted frame 410. FIG. 5-2 shows the lifting forks 502 in a retracted position, i.e. projecting in a direction away from the vehicle mounted frame 410. The first lifting fork 502-1 and second lifting fork 502-2 include a first axial rail 518-1 and a second axial rail 518-2 respectively. The first axial rail 518-1 and second axial rail 518-2 are provided on first fork linear bearing 520-1 and second fork linear bearing 520-2 respectively. In this example, a fork axial control mechanism is provided in the form of a pinion drive including a first fork rack 522-1 provided on the first lifting fork 502-1 and a second fork rack 522-2 provided on the second lifting fork 502-2, a first pinion gear 524-1 engaging the first fork rack 522-1 and a second pinion gear 524-2 engaging the second fork rack 522-2, and a second carriage hydraulic motor 526 driving the first pinion gear 524-1 and second pinion gear 524-2. It will be appreciated that one of the first pinion gear 524-1 or the second pinion gear 524-2 may be driven directly by the second carriage hydraulic motor 526, and also engage the other pinion gear to drive axial movement of the associated lifting fork. In this example, a drag chain 528 is provided to support hydraulic hoses connecting to the second carriage hydraulic motor 526 as the carriage 506 moves between a range of positions across the carriage assembly 500.

Figures 1, 6:
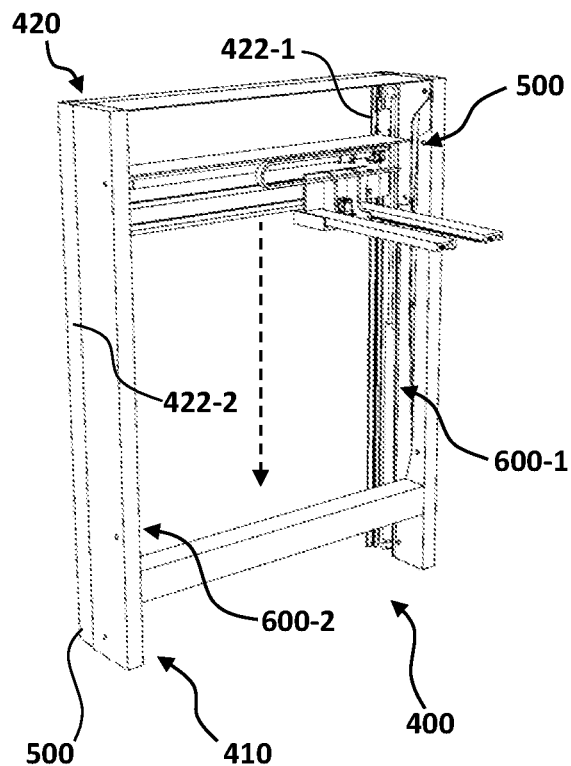
Figures 2, 6:
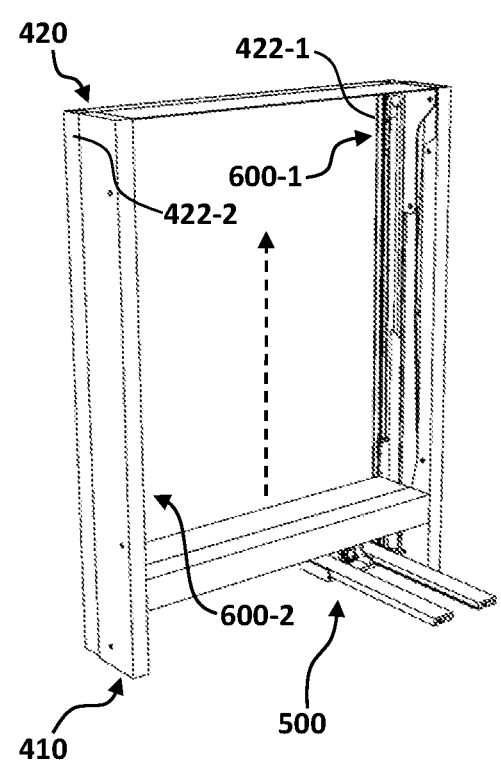
Figures 3, 6:
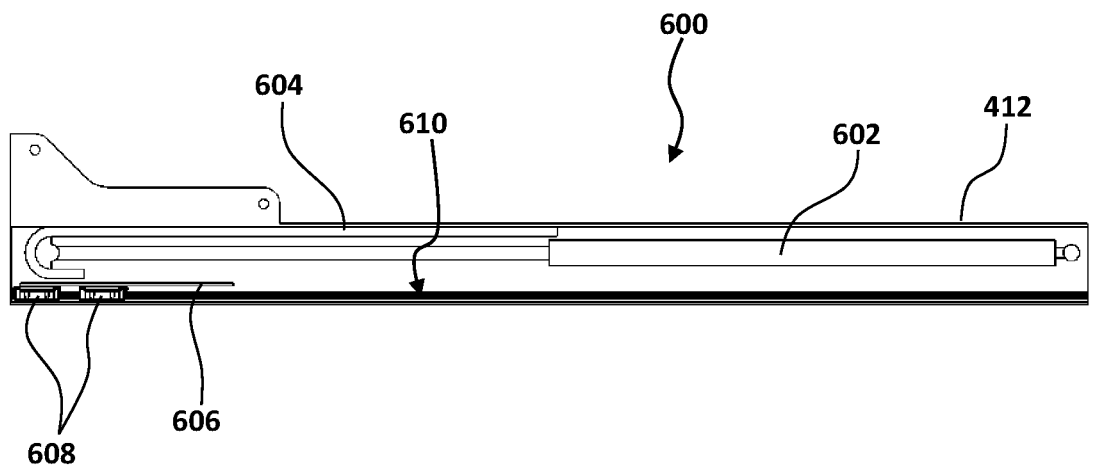

Referring to FIG. 6-1 and FIG. 6-2, the cargo loading system 400 includes a carriage vertical control assembly configured to control raising and lowering of the carriage assembly 500 relative to the mast frame 430, e.g. a raised position as shown in FIG. 6-1, and a lowered position as shown in FIG. 6-2. In examples the cargo loading system 400 may be configured such a portion of the carriage assembly 500 (e.g. the lifting forks 502) may be lowered beyond the mast frame 430— i.e. there is ground clearance below the mast frame 430.

In this example, the carriage vertical control assembly includes a first lifting mechanism 600-1 in the first mast 412-1, and a second lifting mechanism 600-2 in the second mast 412-2. Referring to FIG. 6-3, each lifting mechanism 600 includes a lifting hydraulic cylinder 602 and an associated lift chain 604 connected to a carriage assembly mounting bracket 606. The carriage assembly mounting bracket 606 has carriage linear bearings 608 connected to a mast rail 510, the mast rail 510 extending along the mast 412. As well as guiding vertical movement of the carriage assembly 500, this connection also assists with tying the masts 412-1 and 412-2 together. In use, the lifting hydraulic cylinders 602 are raised and lowered to control the height of the carriage assembly 500, with the lift chains 604 increasing the effective travel of the hydraulic cylinders 602.

It is envisaged that when not in use (including during movement of the vehicle proper) the cargo loading system 400 may be closed with the carriage assembly 500 lowered and the lifting forks 502 extended into a stowing space of the vehicle, as generally illustrated in FIG. 6-2. When used to unload cargo stored in the storage space, the lifting forks 512 may be retracted, the carriage assembly 500 raised to the desired height, the carriage 506 moved laterally into the desired position, and the lifting forks 512 extended.

Figures 1, 7:
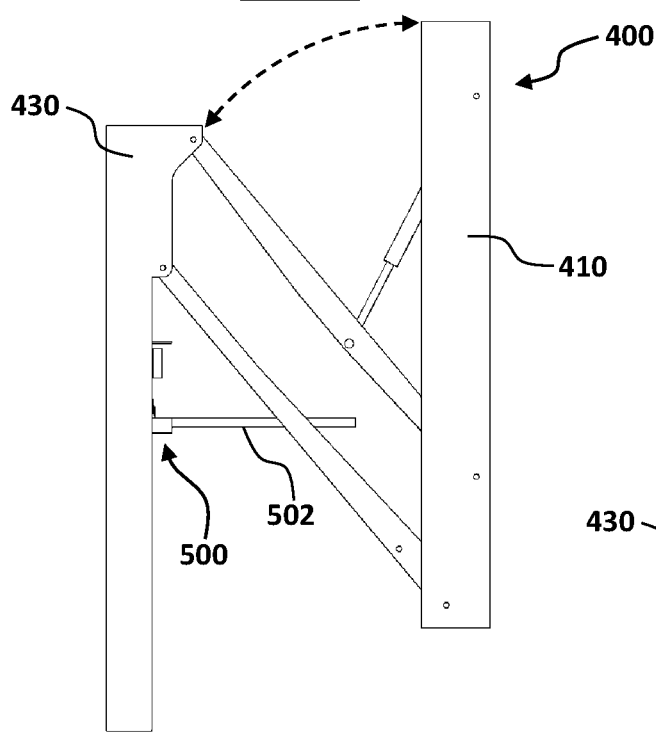
Figures 2, 7:
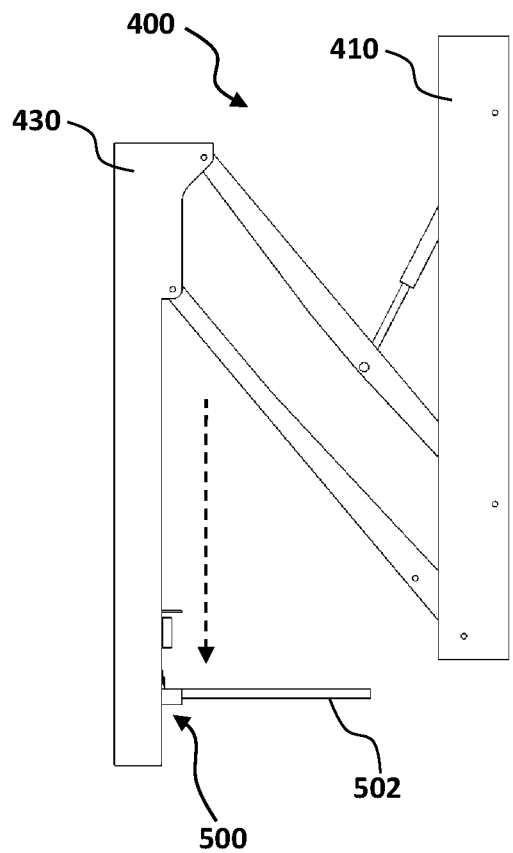
Figures 3, 7:
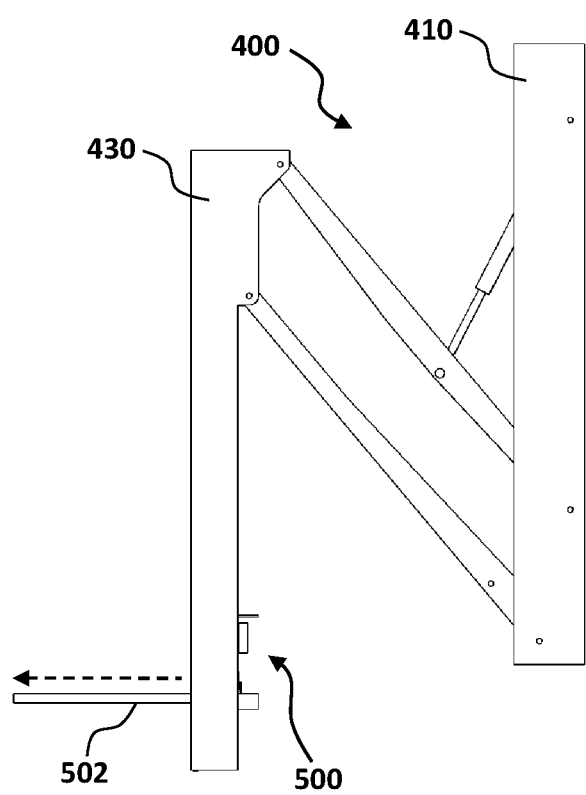

The carriage assembly 500 may then be raised to take the load of the cargo, and the mast frame 420 moved away from the vehicle mounted frame 410 through an arc as shown in FIG. 7-1. In examples, the cargo loading system 400 may be configured such that the height of the carriage assembly 500 relative to the mast frame 420 may be maintained through the movement of the mast frame 420. In alternative examples, where the lifting forks 502 may not have sufficient clearance, the carriage assembly 500 may be raised during this movement.

The loaded carriage assembly 500 may then be lowered (as illustrated by FIG. 7-2) to deposit the cargo at ground level, at which time the lifting forks 502 may be retracted (as illustrated by FIG. 7-3) to clear the cargo.

It will be appreciated that loading of cargo may be performed using a reversed order of operations, i.e. the cargo may be positioned at ground level and lifted to the cargo storage area using the cargo loading system 400.

Second Exemplary Cargo Loading System

Figure 8:
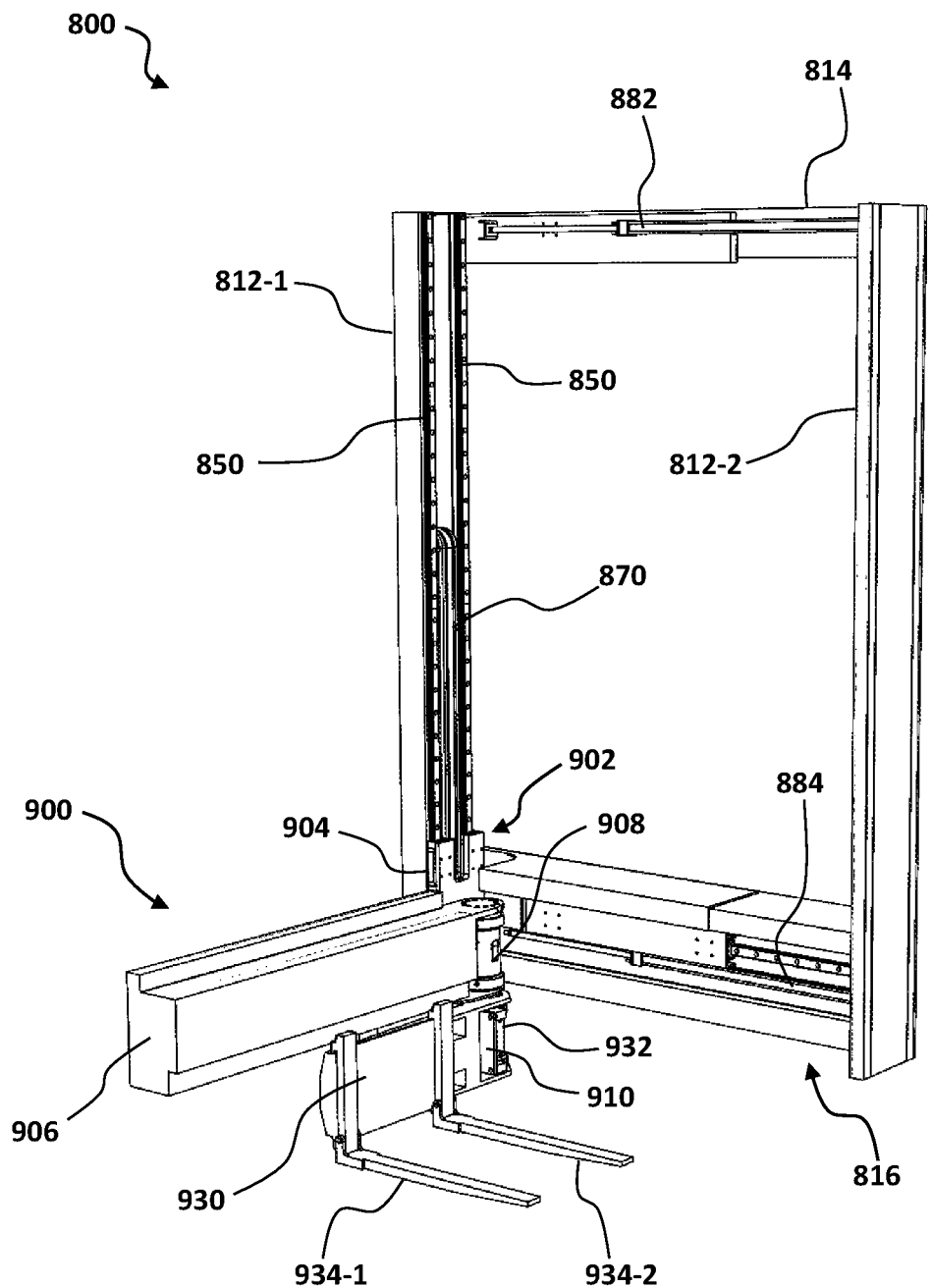
FIG. 8 is a perspective view of a second exemplary cargo loading system.

FIG. 8 illustrates a cargo loading system 800 according to another aspect of the present technology. The system 800 includes a vehicle mounted mast frame 810 configured to be secured to the cargo storage area 102 at the rearward end 112. The vehicle mounted mast frame 810 includes a first upright member in the form of primary mast 812-1 and a second upright member 812-2. In use, the second upright member 812-2 remains in a fixed position relative to the cargo storage area 102. In this example, the vehicle mounted mast frame 810 further includes an upper crossmember assembly 814 and a lower crossmember assembly 816 connecting the primary mast 812-1 and the second upright member 812-2.

A carriage assembly 900 is supported by the primary mast 812-1, the carriage assembly 900 including a carriage assembly mounting bracket 902 having carriage linear bearings 904 connected to mast rails 850, with the mast rails 850 extending along the length of the primary mast 812-1.

Figure 10:
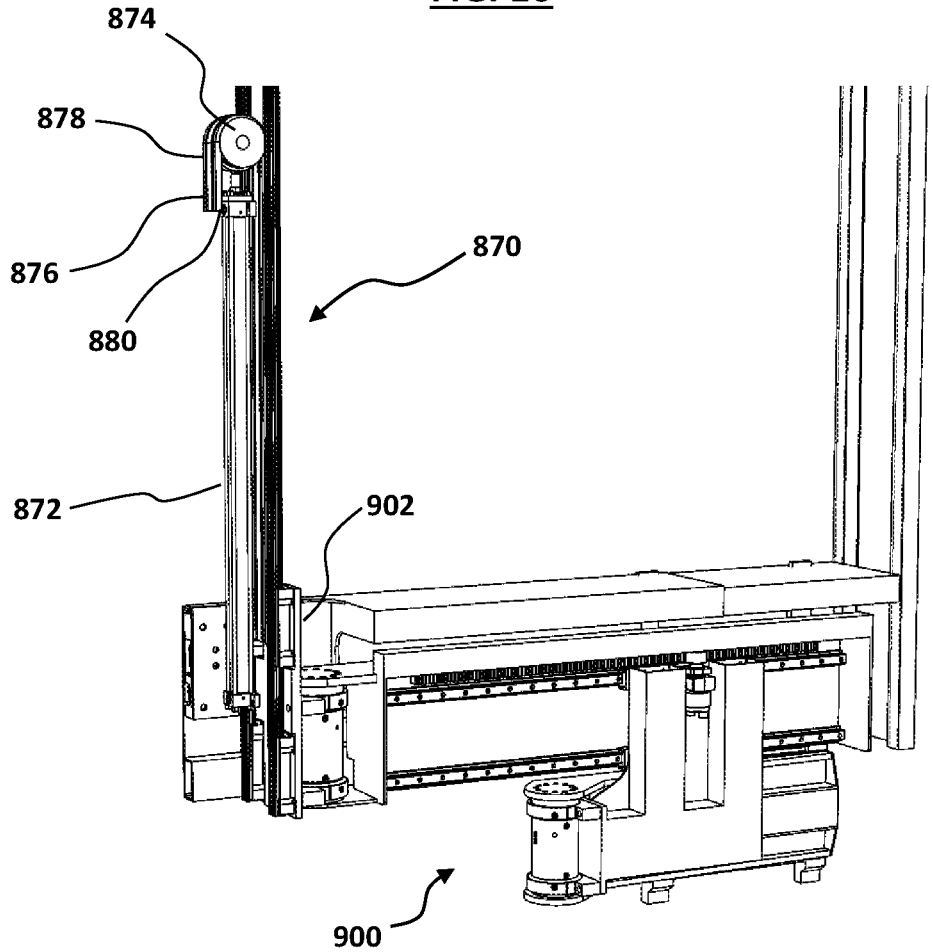
FIG. 10 is a perspective view of an exemplary lifting mechanism of the second cargo loading system.

A carriage assembly main arm 906 of the carriage assembly 900 is pivotally mounted to the carriage assembly mounting bracket 902 by a first helical hydraulic rotary actuator 908. The first helical hydraulic rotary actuator 908 may be controlled to pivot the carriage assembly main arm 906 about a first vertical axis through 90 degrees between a perpendicular position as shown in FIG. 8 (i.e. perpendicular relative to upper crossmember assembly 814 and/or lower crossmember assembly 816), and a parallel position as shown in FIG. 10 (i.e. parallel to upper crossmember assembly 814 and/or lower crossmember assembly 816).

Figures 1, 9:
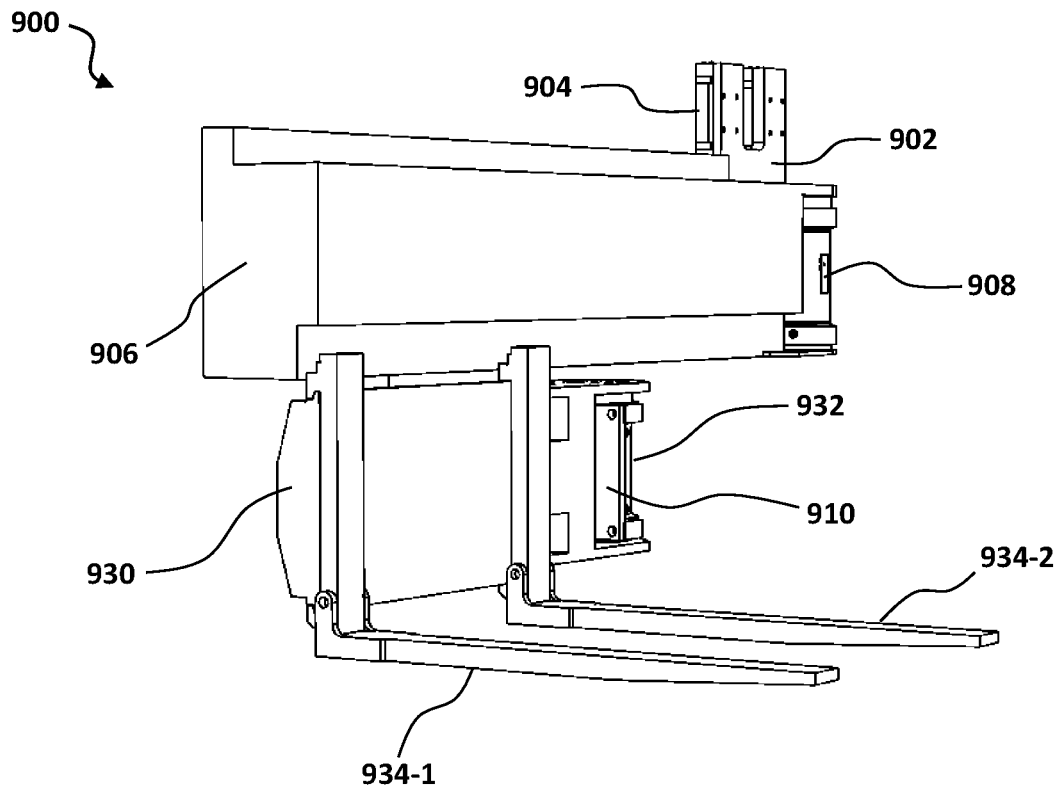
Figures 2, 9:
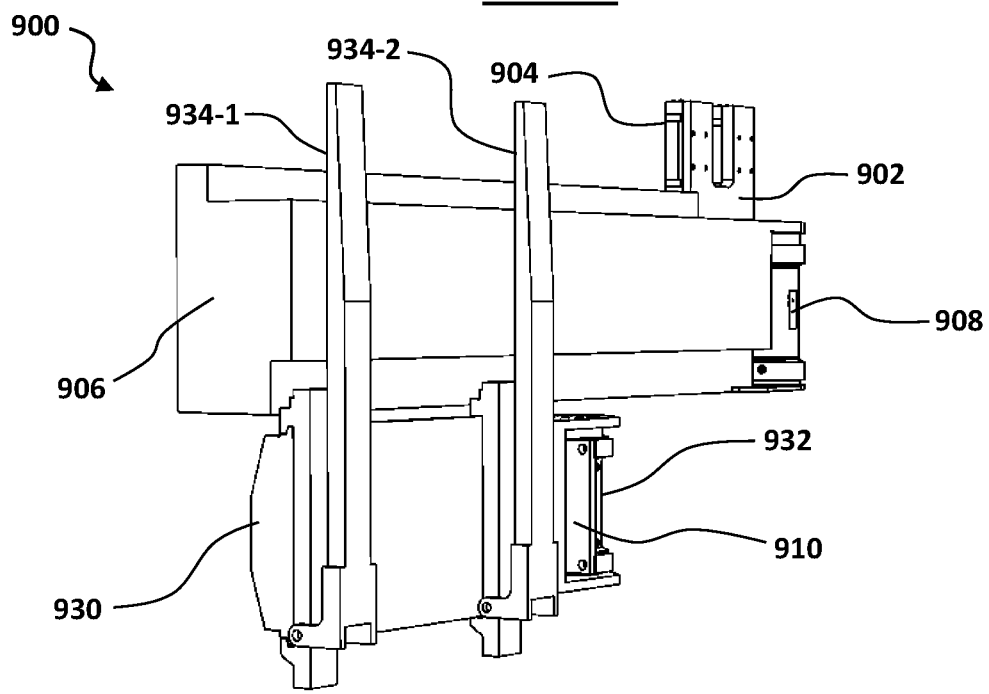
Figures 3, 9:
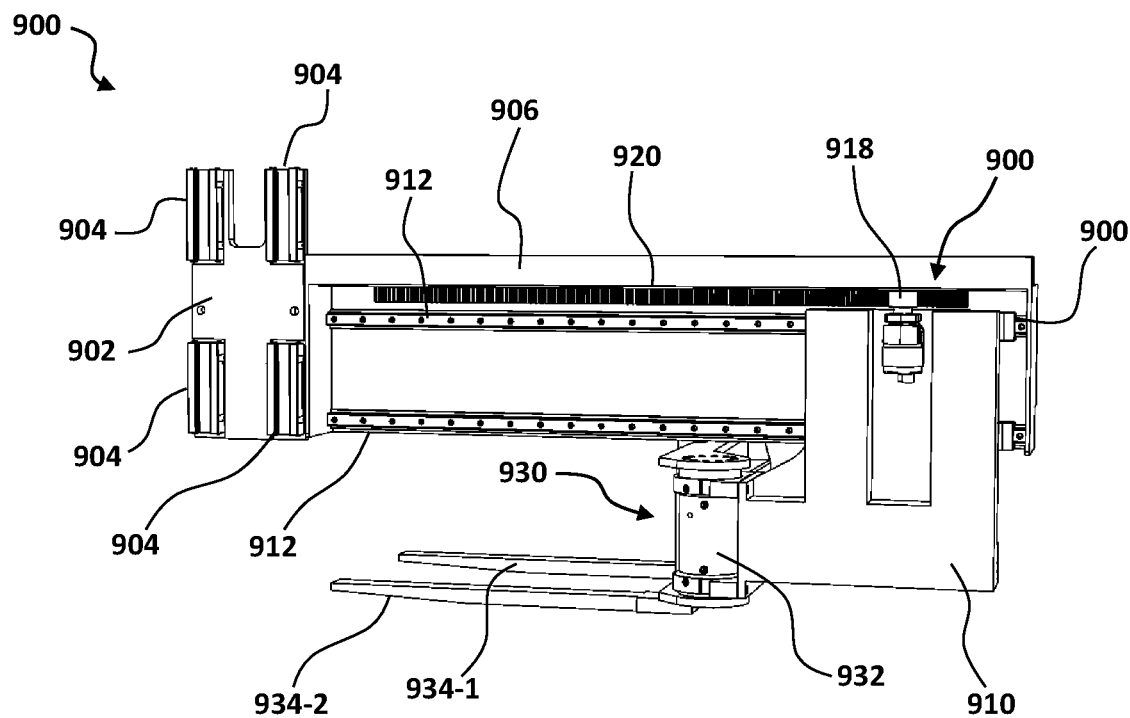
Figures 4, 9:
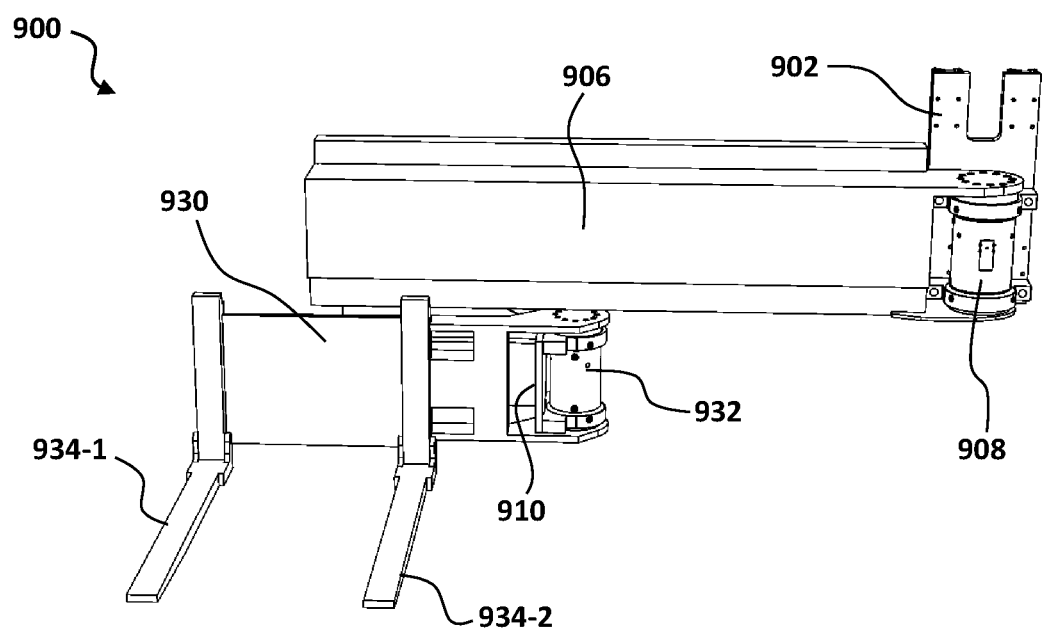
Figures 5, 9:
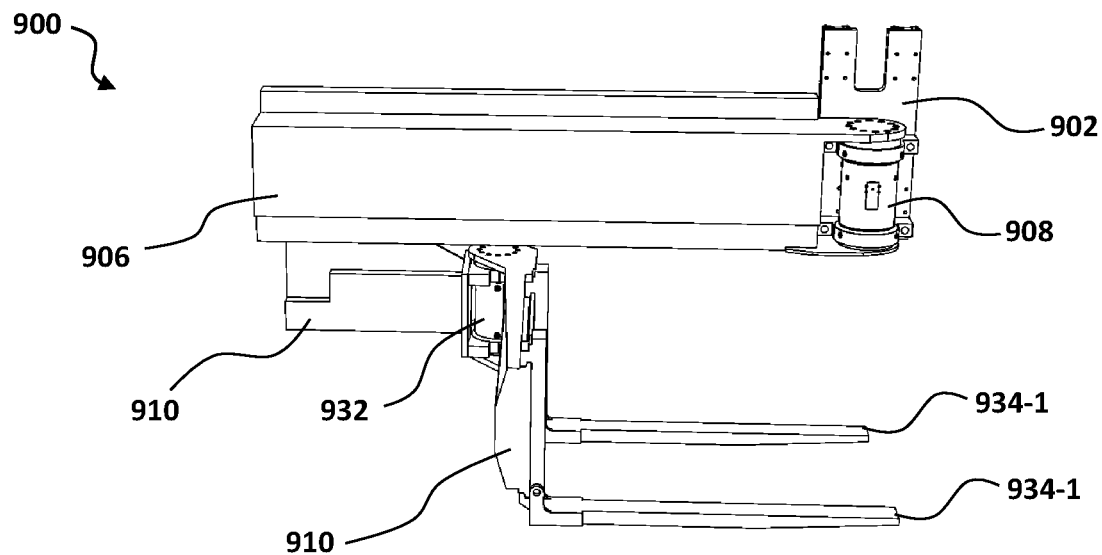

The carriage assembly 900 further comprises a lifting fork carriage base 910. The lifting fork carriage base 910 is mounted to carriage rails 912 (as shown in FIG. 9-3)

extending along carriage assembly main arm 906 using linear bearings 914 (as shown in FIG. 9-3), which guide lateral movement of the lifting fork carriage base 910 along carriage assembly main arm 906. A fork lateral control mechanism 916 is provided to control lateral movement of the lifting fork carriage base 910, as shown in FIG. 9-3. In this example, the fork lateral control mechanism 916 includes a linear actuator in the form of a carriage hydraulic motor 918 driving a pinion gear engaging with a rack 920 extending along the carriage assembly main arm 906.

The carriage assembly 900 further comprises a lifting fork arm 930 pivotally mounted to the lifting fork carriage base 910 by a second helical hydraulic rotary actuator 932. The second helical hydraulic rotary actuator 932 may be controlled to pivot the lifting fork arm 930 through 90 degrees between a perpendicular position as shown in FIG. 9-4 (i.e. perpendicular relative to carriage assembly main arm 906), and a parallel position as shown in FIG. 9-5 (i.e. parallel to carriage assembly main arm 906).

A first lifting fork 934-1 and second lifting fork 934-2 (referred to herein as lifting forks 934) are provided to lifting fork arm 930. The lifting forks 934 are pivotally connected to the lifting fork arm 930, and moveable between a lowered in-use position as shown in FIG. 9-1, and a raised stored position as shown in FIG. 9-2.

Figures 1, 12:
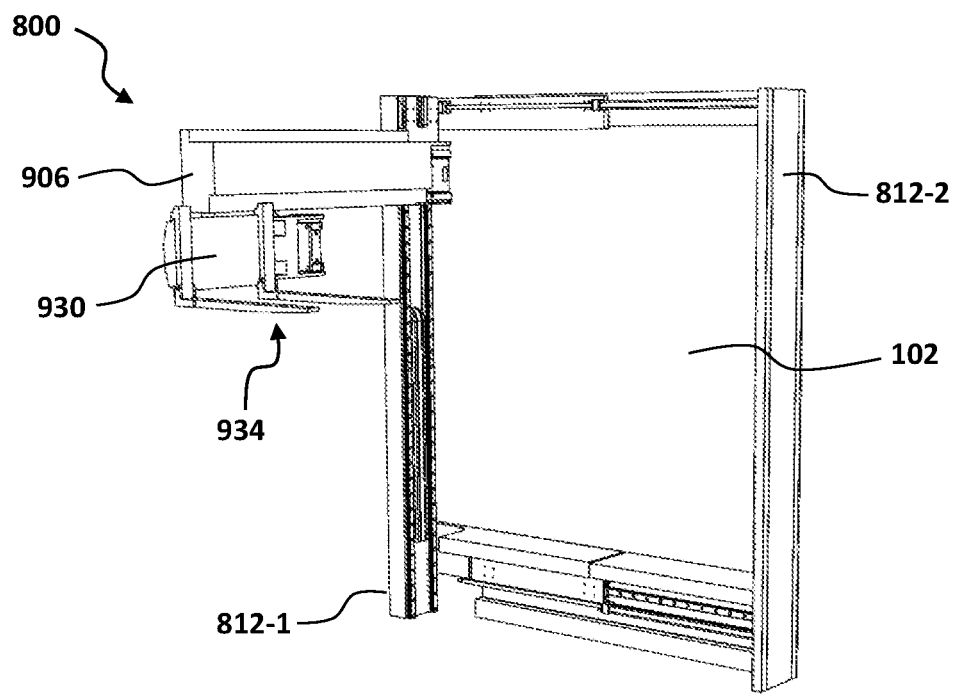
Figures 2, 12:
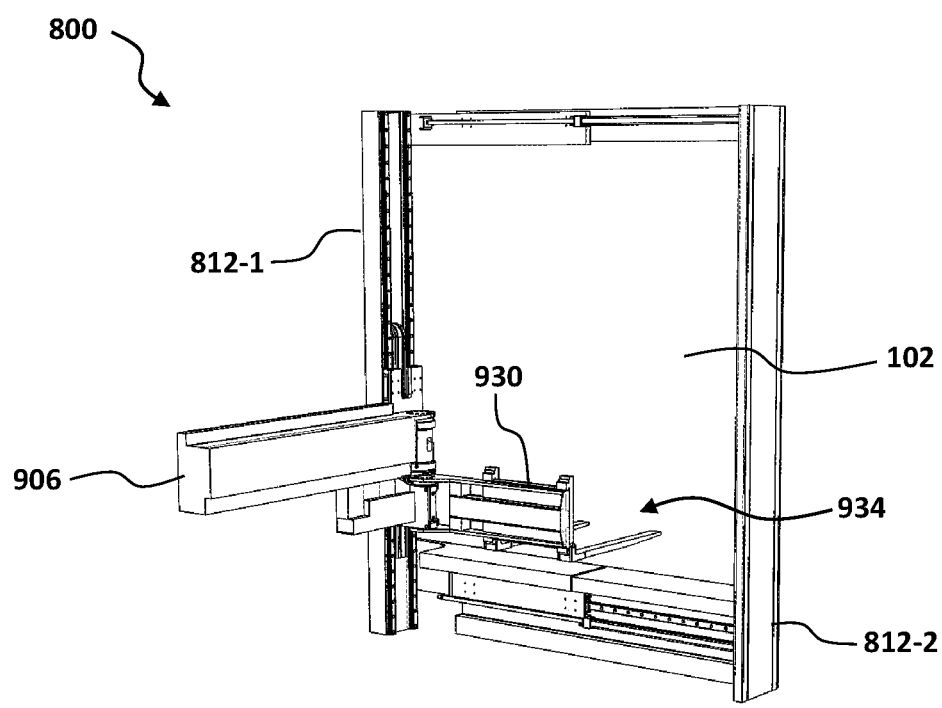

Referring to FIG. 10, the cargo loading system 800 includes a carriage vertical control assembly in the form of lifting mechanism 870, configured to control raising and lowering of the carriage assembly 900 relative to the primary mast 812-1, e.g. a raised position as shown in FIG. 12-1, and a lowered position as shown in FIG. 8. In this example, the lifting mechanism 870 is provided in the primary mast 812-1. The lifting mechanism 870 includes a lifting hydraulic cylinder 872 and lifting pulley 872, with associated lift chain 874 trained over the lifting pulley 872 and connected to the carriage assembly mounting bracket 902. Hydraulic line 878 and electrical line 880 also run over the same lifting pulley 874, allowing connection between the mast frame 810 and carriage assembly 900.

In this example, the upper crossmember assembly 814 and lower crossmember assembly 816 are provided in sliding sections, with lateral frame actuators in the form of upper hydraulic cylinder 882 and lower hydraulic cylinder 884 therebetween to control relative movement across the open end of the cargo storage area 102.

Figures 1, 11:
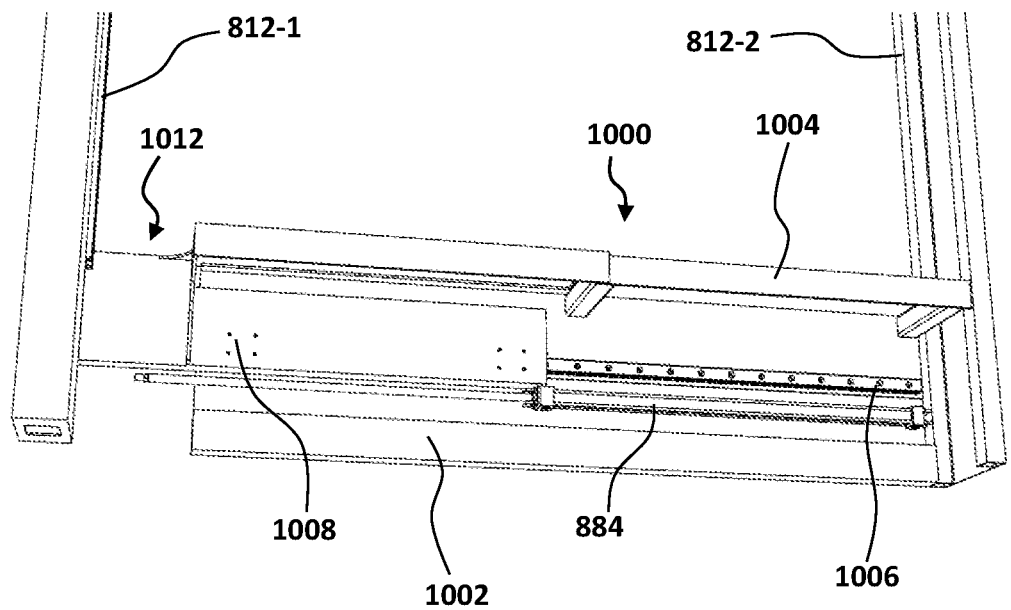
Figures 2, 11:
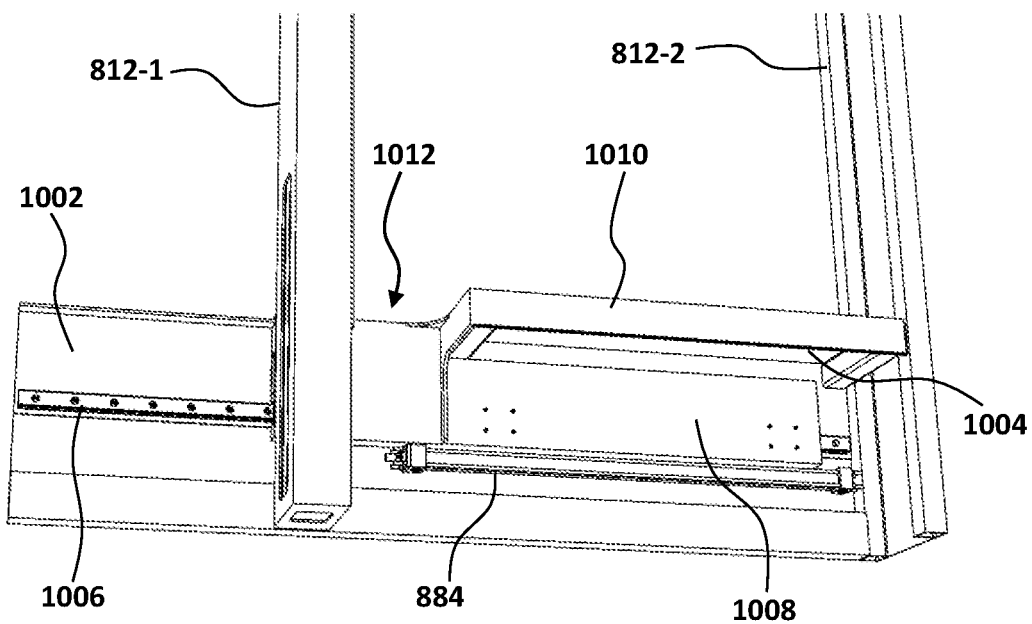

Referring to FIG. 11-1 and FIG. 11-2, the lower crossmember assembly 816 includes a floor assembly 1000. The floor assembly 1000 has a first base portion 1002, and a first stationary floor portion 1004 adjacent the second upright member 812-2. A lower linear rail 1006 extends along the base portion 1002—i.e. across the open end of the cargo storage area 102. A second base portion 1008 is mounted to the lower linear rail 1006 (for example, using linear bearings), and has a second floor portion 1010. In use, the second floor portion 1008 slides over the first stationary floor portion 1004 to present a complete floor at the open end of the cargo storage area 102. A gap 1012 is provided between the second floor portion 1010 and the primary mast 812-1 to permit passage of the carriage assembly 900 along the primary mast 812-1.

In use, the lifting forks 934 may be moved through a range of motions in order to load and unload cargo (for example, loaded onto pallets) relative to the cargo storage area 102. The lateral movement of the primary mast 812-1 enables positioning across the width of the cargo storage area 102, while vertical movement of the carriage assembly 900 along the primary mast 812-1 enables movement of the lifting forks 934 between an upper level and ground level (and positions therebetween). Linear movement of the lifting forks 934 along the carriage assembly main arm 906 allows the forks 934 to be inserted into, and extracted from, the cargo storage area 102. Pivotal movement of the lifting fork arm 930 assists with ground loading/unloading (in conjunction with the lateral movement of the primary mast 812-1).

The cargo loading system 800 may be stored in different positions, depending on the current use of the vehicle. For example, during transit it is envisaged that the forks 934 may be folded up, and the carriage assembly 900 pivoted to be parallel to, and resting on, the floor assembly 100. In this position, the weight of the carriage assembly 900 is supported to reduce the likelihood of creep of the hydraulic lifting mechanism 870 during transport. In another example, when access to the cargo storage area 102 is required, without use of the cargo loading system 800, the carriage assembly 900 may be lowered below the floor assembly 1000 and pivoted to be parallel to the floor assembly 1000 (i.e. such that the forks 934 project below the floor assembly 1000). The various steps or acts in a method or process described in connection with the present disclosure may be performed in the order described, or may be performed in another order. Additionally, one or more process or method steps may be omitted or one or more process or method steps may be added to the methods and processes. An additional step, block, or action may be added in the beginning, end, or intervening existing elements of the methods and processes.

Reference throughout this specification to "one example" or "an example" (or the like) means that a particular feature, structure, or characteristic described in connection with the example is included in at least one embodiment of the disclosure. Thus, appearances of the phrases "in one example" or "in an example" or the like in various places throughout this specification are not necessarily all referring to the same embodiment.

Furthermore, the described features, structures, or characteristics may be combined in any suitable manner in at least one embodiment. In the foregoing description, numerous specific details are provided to give a thorough understanding of the exemplary embodiments. One skilled in the relevant art may well recognize, however, that embodiments of the disclosure can be practiced without at least one of the specific details thereof, or can be practiced with other methods, components, materials, et cetera. In other instances, well-known structures, materials, or operations are not shown or described in detail to avoid obscuring aspects of the invention.

The illustrated examples of the disclosure will be best understood by reference to the figures. The foregoing description is intended only by way of example and simply illustrates certain selected exemplary embodiments of the disclosure.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps, that is to say, in the sense of "including, but not limited to".

What is claimed is:

1. A cargo loading system for use with a cargo storage area of a vehicle, the cargo loading system comprising:
   a mast frame;
   a carriage assembly supported by the mast frame, the carriage assembly comprising:

lifting forks;
a fork lateral control mechanism configured to control lateral movement of the lifting forks across the carriage assembly; and
a carriage pivot control mechanism configured to control pivotal movement of the carriage assembly relative to the mast frame about a first vertical axis, wherein the carriage pivot control mechanism comprises a first rotary actuator configured to pivot the carriage assembly about the first vertical axis;
a fork pivot control mechanism configured to control pivotal movement of the lifting forks relative to the carriage assembly about a second vertical axis, between a first position in which the lifting forks extend away from the carriage assembly and a second position in which the lifting forks extend along the carriage assembly;
a carriage vertical control assembly configured to control raising and lowering of the carriage assembly relative to the mast frame;
a mast frame actuating assembly configured to control lateral movement of the mast frame relative to an open end of the cargo storage area of the vehicle.

2. The cargo loading system of claim 1, wherein the mast frame comprises a primary mast, the carriage assembly is mounted to the primary mast, and the first vertical axis is provided proximal to the primary mast.

3. The cargo loading system of claim 1, wherein the rotary actuator comprises a helical hydraulic rotary actuator.

4. The cargo loading system of claim 1, wherein the carriage assembly comprises a main carriage arm, and a carriage to which the lifting forks are mounted, wherein the carriage is mounted to the main carriage arm to permit movement along a longitudinal axis of the main carriage arm.

5. The cargo loading system of claim 4, wherein the carriage comprises a base portion configured to be mounted to the main carriage arm, and a fork arm to which the lifting forks are provided, wherein the fork pivot control mechanism is provided between the base portion and the fork arm.

6. The cargo loading system of claim 1, wherein the mast frame comprises a floor assembly comprising a first floor portion and a second floor portion, wherein the first floor portion is configured to remain stationary in use, and the second floor portion is configured to move laterally with the mast frame.

7. The cargo loading system of claim 6, wherein the first floor portion and the second floor portion overlap.

* * * * *